United States Patent Office 3,409,102
Patented Nov. 5, 1968

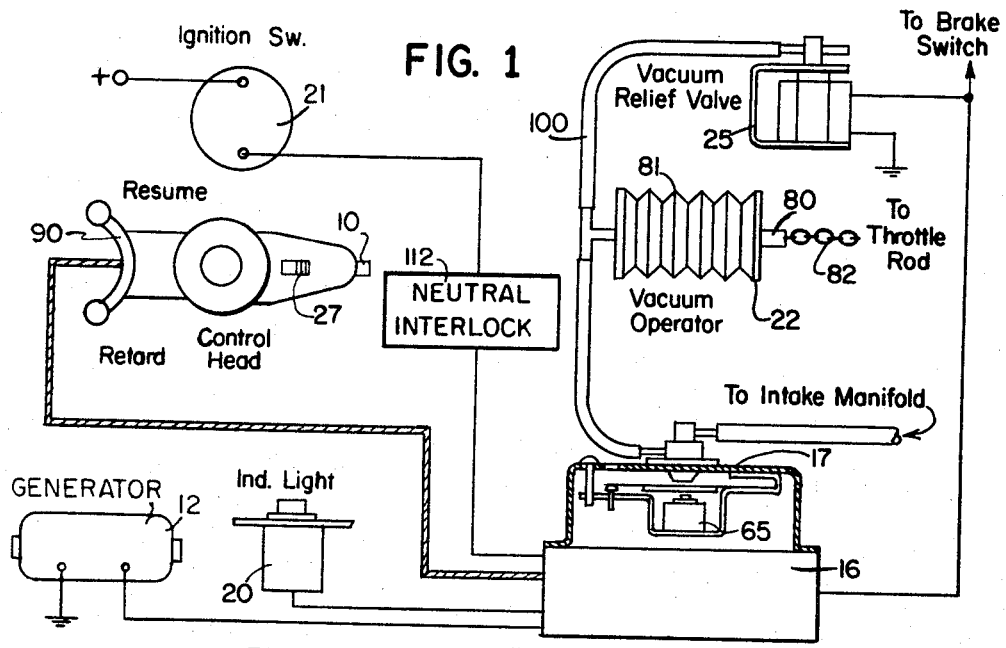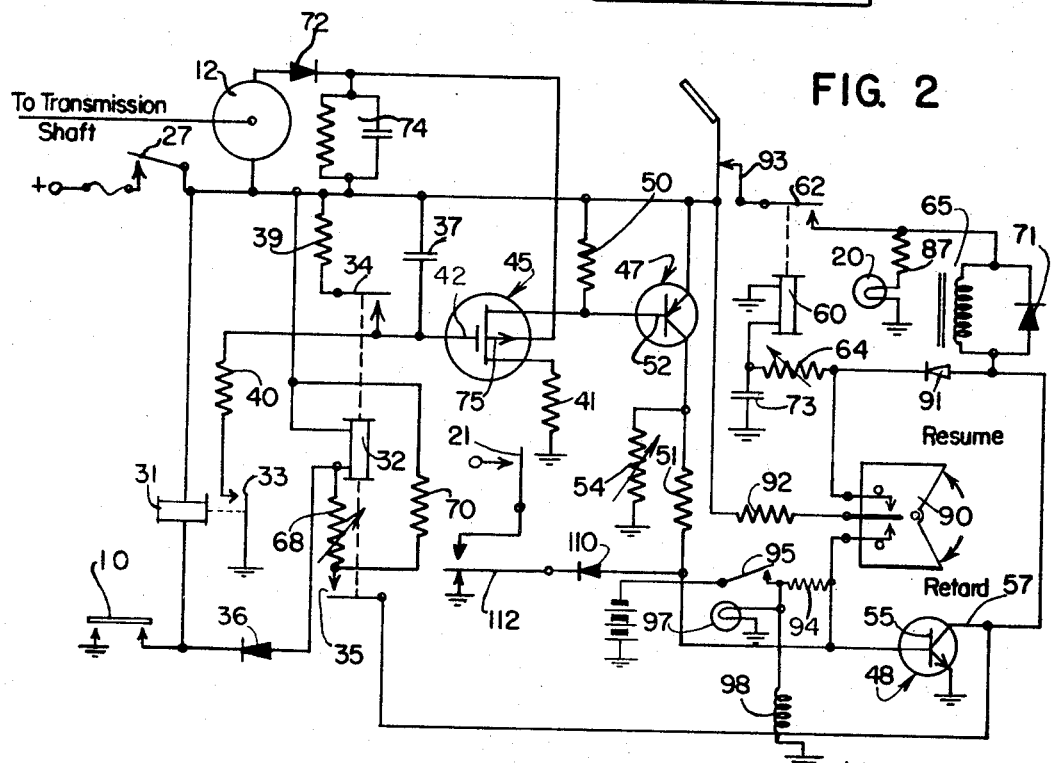

3,409,102
SPEED CONTROL SYSTEM
Nicholas T. Neapolitakis and Elmer E. Prothero, Chicago, Ill., assignors to Motorola, Inc., Franklin Park, Ill., a corporation of Illinois
Filed May 5, 1966, Ser. No. 548,012
11 Claims. (Cl. 180—109)

ABSTRACT OF THE DISCLOSURE

A speed control system for a vehicle using a field effect transistor to control the current to a solenoid which operates a regulator valve to control a vacuum operator, which positions the engine throttle. A memory capacitor establishes and maintains a potential representing the desired rate of travel of the vehicle on one control electrode of the field effect transistor. An alternator driven by the transmission shaft generates a potential which is proportional to the rate of travel of the vehicle, which potential is coupled to the second control electrode of the field effect transistor. The difference in potential on the two control electrodes controls the current through the field effect transistor.

---

This invention pertains generally to an electrical system for controlling the rate of movement of a cyclicly moving member, and more particularly to an automatic speed control for an automobile.

Traveling long hours at the same speed can be very fatiguing, not only because of the effort required to steer the car, but also because of the continuous process of observing the speed on the speedometer and varying the foot pressure on the accelerator to maintain a steady rate of travel. In addition to being fatiguing, continuous acceleration and de-acceleration over long periods adds significantly to engine wear and reduces gas mileage.

It is one object of this invention to provide an improved system for controlling the repetition rate of a cyclicly moving member.

It is another object of this invention to provide an automobile speed control for a vehicle that provides constant speed operation to thereby reduce driver fatigue and increase gasoline mileage.

Electromechanical speed control systems for automobiles have been developed that have a memory capability so that should the system be disabled, for instance, by stepping on the brakes, the system may be re-activated thereby restoring the car to the previously set speed. One major problem with these systems, however, has been their size and complexity.

It is a further object of this invention to provide an automatic speed control for a vehicle that has a memory capability to restore the vehicle to the controlled rate of speed, should the control be temporarily disabled and which is simple, compact and relatively inexpensive to manufacture.

A feature of this invention is a system for controlling the repetition rate of a cyclicly moving member which includes a device producing a potential representing the repetition rate of the member, a memory capacitor for establishing and maintaining a potential representing the desired repetition rate, and a field effect transistor including first and second control electrodes coupled to the device and the capacitor. The field effect transistor is responsive to the potential of the memory capacitor and the potential representing the repetition rate of the member to energize rate control means to control the repetition rate of the member.

Another feature of this invention is the system for controlling the repetition rate of a cyclicly moving member having an activating device including contacts, wherein a memory capacitor is charged to a predetermined potential in response to closing of the contacts, and upon the opening of the contacts is discharged to a potential representing the desired repetition rate of the member. The capacitor maintains the potential representing the desired repetition rate of the member during the period that the contacts remain open.

Still another feature of this invention is the control of the cyclicly moving engine of a motor vehicle by use of rate control means which comprises a vacuum regulator valve including a solenoid, a vacuum operator coupled to the vacuum regulator valve, and a throttle coupled between the vacuum operator and the engine, with the output stage of an amplifier being coupled to the solenoid for operating the regulator valve. The potential representing the desired rate of travel of the vehicle is coupled to the first control electrode of the field effect transistor and with the rate of travel of the vehicle being below the desired rate of travel, the potential coupled to the second control electrode thereof causes the field effect transistor to bias the amplifier to increase the current through the solenoid to control the vacuum regulator valve to vary the vacuum in the vacuum operator, thereby advancing the throttle to increase the rate of travel of the vehicle. When the rate of travel of the vehicle exceeds the desired rate of travel, the potential coupled to the second control electrode is increased causing the field effect transistor to bias the amplifier to decrease the current through the solenoid to vary the vacuum in the vacuum operator thereby retarding the throttle to decrease the rate of travel of the vehicle.

A further feature of this invention is an automatic speed control for a motor vehicle having a control with a first position for temporarily retarding the vehicle rate of travel by coupling a potential to the power output stage of the amplifier thereby disabling the vacuum control regulator to return the throttle to the idle position without discharging the memory capacitor. The control has a second position that energizes the power output stage of the amplifier, and, because the memory capacitor maintains the charge subsequent to the first operation, the vehicle returns to the desired constant rate of travel.

In the drawings:
FIG. 1 is a block schematic diagram illustrating the operation of the rate control system in accordance with this invention; and
FIG. 2 is a schematic wiring diagram of the system shown in FIG. 1.

In one embodiment of this invention, a small alternator is connected to a vehicle transmission shaft to produce a potential representing the rate of travel of the vehicle. The potential from the alternator is coupled to one of two gates in a field effect transistor, and a memory capacitor is coupled to the other gate. An activating button operates a switch to complete a circuit to charge the memory capacitor to a predetermined potential. When the button is released, the capacitor is discharged until the system reaches a state where the potential across the capacitor represents the desired rate of travel of the vehicle. Until the activate button is pressed once again, the memory capacitor will maintain the potential representing the desired rate of travel of the vehicle. An amplifier has a driver stage that is coupled to the field effect transistor and a power output stage that is coupled to a solenoid which is a part of a vacuum regulator valve. A vacuum operator is coupled between the vacuum regulator valve and the engine throttle.

When the automobile is traveling slower than the desired rate of travel, the potential from the alternator representing the rate of travel of the automobile which is coupled to one gate of the field effect transistor will decrease and with the potential on the other gate remaining constant, will cause the current through the field effect transistor to increase thereby increasing the output of the driver stage of the amplifier which in turn increases the output of the power output stage. As the output of the power output stage increases, so does the current flow through the solenoid of a vacuum regulator valve which acts to adjust the vacuum regulator valve to increase the vacuum to the vacuum operator to cause the same to advance the throttle to increase the rate of travel of the automobile. However, when the automobile is traveling faster than the desired rate of travel, the output of the alternator will increase thereby causing a decrease in the current flow through the field effect transistor which reduces the drive of the amplifier to cause less current flow through the solenoid. This acts to reduce the vacuum output of the regulator to the vacuum operator and retards the throttle thereby decreasing the rate of travel of the automobile.

A general understanding of the invention may be had by referring to FIG. 1. When the car is traveling at the desired rate of speed, the operator presses button 10 located on the control head, which is mounted in a convenient place near, for instance, the rim of the steering wheel and then releases it. This causes a memory capacitor, which will be described subsequently, to be charged to a potential which represents the rate of speed of the automobile when the button 10 was pressed. A small alternator 12 is coupled to the transmission shaft, for instance, of the vehicle and generates a potential representing the rate of rotation of this shaft, and under traction conditions represents the rate of rotation of the wheels and hence the speed of the vehicle. The rate of speed as indicated by the potential from the alternator 12 is compared with the potential of the memory capacitor, representing the desired rate of speed, by the electronic system 16. An indicator light 20 informs the driver when the automatic speed control system has taken control of the speed of the car.

The electronic system 16 is coupled to a potential through the ON side of ignition switch 21 and controls a vacuum regulator valve 17 which translates the change in voltage linearly into a change in vacuum and applies this change in vacuum to a vacuum operator 22 which controls the throttle setting to thereby control the speed of the automobile.

Should the driver of the automobile desire to accelerate to pass a car, he may simply override the speed control system by applying foot pressure to the accelerator.

For safe operation, it is necessary for the system to be disabled when the brakes are applied. Both electromechanical and electronic interlocks provide these safety features. When the brakes are applied, a vacuum relief valve 25 is actuated and vents atmospheric air to the vacuum operator 22 to return the throttle to its idle position. In addition, the application of the vehicle brakes also electronically disables the system as will be explained subsequently along with the other electronic safety features of the system.

A more detailed explanation of the operation of the speed control system may be had by referring to FIG. 2 of the drawing. The system is energized by closing the switch 27 which could be the ignition switch, or ON-OFF switch connected to battery potential through ignition switch 21. When the car is at the desired speed the activate button 10 is pressed. This does two things. First it applies a potential to reed relays 31 and 32 which operate to close the contacts 33, 34 and 35. With these contacts closed, the memory capacitor 37 is charged across the voltage divider formed by resistors 39 and 40.

The capacitor 37 is charged to a voltage which is about ⅔ the voltage of the battery, or about 10 volts. Now the capacitor 37 is more than sufficiently charged and is coupled to the first gate 42 of field effect transistor 45, the field effect transistor 45 is driven fully on. Coupled to the output of field effect transistor 45 is a transistor amplifier which has a driver stage, transistor 47 and an output power stage transistor 48. As the current increases through the field effect transistor 45, the resistor 50 reduces the potential on base 52 of the driver stage transistor 47 thereby increasing the current output of the same. With an increase in the output of transistor 47, variable resistor 54 biases the base 55 of the power output transistor 48 to cause that transistor to conduct. When the transistor 48 is conducting in this condition, the potential on collector 57 will be less than 5 volts, which is insufficient, when applied through diode 91 and resistor 64 to the relay 60, to close the contacts 62. With approximately 5 volts across transistor 48, there is applied approximately 8 volts across relay 32, enough to keep the relay closed independently of the circuit to relay 32 through the activate switch 10, and blocking diode 36 isolates resistor 68 from the power supply through the coil relay 31.

When the activate pushbutton is released, the contact 33 will open. The memory capacitor 37 will discharge through contacts 34 and resistor 39. As the capacitor 37 discharges, the bias on the gate 40 of the field effect transistor 45 will decrease thereby reducing the current flow through the field effect transistor 45 biasing the transistor 47 to reduce the output of the power output transistor 48 causing the voltage on the collector 57 thereof to rise. As the voltage on collector 57 rises, it will cause a reduction of the voltage applied through resistor 68 to the relay 32.

The increasing voltage at the collector 57 of transistor 55 is applied through diode 91 and resistor 64 to the relay 60. The sensitivity of this relay is adjusted by means of the resistor 64. When the voltage across relay 60 is slightly greater than 5 volts, the reed contacts 62 will close and activate the solenoid 65 of the vacuum regulator 17. When the voltage across relay 32 falls below the drop out voltage of the reed contact 35, the relay 32 will be de-energized and cause the contacts 35 and 34 to open. Variable resistor 68 is adjusted so that the magnetic reed contacts 35 will open about 50 milliseconds after the relay 60 operates. The drop out sensitivity of the reed contacts 35 is adjusted through the variable resistor 68 so that when the activate pushbutton is pressed and released, and after the interlock relay 60 goes through the sequence of setting up the system for the particular cruising speed, the voltage across the vacuum regulator relay 65 is enough to provide a vacuum pressure of about two and one-half inches of vacuum.

The resistor 70 coupled across relay 32 and resistor 68 is used to simulate the load of the vacuum regulator relay 65, so that when the relay 60 closes connecting the relay 65 to the battery potential, a voltage surge across the regulator 65 will not occur and hold in the contacts 34 and 35 longer than desired causing capacitor 37 to be charged to the wrong potential thereby causing the system to regulate the vehicle to a speed other than the selected speed. The diode 71 across the vacuum regulator relay 65 prevents a spike that is formed when the relay 65 is removed from the circuit by opening of the contacts 62. Capacitor 73, when charged, insures that the relay 60 will remain energized to close contacts 62 despite a fluctuating potential on the collector of transistor 48, during the opening of contacts 34 and 35.

An indicator light 20 is connected to the electrical supply through contacts 62 and resistor 87. When the contacts 62 are open no current flows through the indicator light. However, when the contacts 62 are closed, a supply voltage is applied to the indicator lamp across resistor 87 which is sufficient to light the filament.

During the time that the relays are going through the sequence of setting up the speed control system for a particular cruising speed, the output of the alternator 12, which is proportional to the speed of the car, is being rectified by diode 72 and RC filter circuit 74 to provide a potential on the second gate 75 of the field effect transistor 45, which potential is proportional to the actual speed of the car. As previously stated, when the activate pushbutton 10 is first closed the memory capacitor 37 is charged to a predetermined potential approximating ⅔ of the potential of the battery. When the button 10 is released, the capacitor 37 commences to discharge through resistor 39 as described previously, until relay 32 opens to open contacts 34. Because the gate 42 has an extremely high impedance, leakage through the field effect transistor 45 will be negligible, therefore the potential on capacitor 37 at that time will be held to provide a memory action. Because the relay 32 is controlled by transistor 48 which is in turn controlled by the conduction of transistor 45, the capacitor 37 will be discharged to a point related to the potential applied to gate 75 from the alternator 12. It should be clear, therefore, that the capacitor 37 will discharge each time to a potential depending on the speed that the car is going when the button 10 is actuated.

With the system energized, and the button 10 pushed, for example, with the car going at a rate of speed of 50 miles per hour, the capacitor 37 will be discharged to a potential representing the 50 miles per hour speed. Therefore, if the car is traveling at some speed slower than 50 m.p.h., the potential coupled from the alternator 12 to the gate 75 of field effect transistor 45 will cause increased conduction of the transistor 45 biasing the transistor 47 of the amplifier into greater conduction, which in turn causes the power output transistor 48 of the amplifier to increase the current through coil 65 of the vacuum regulator valve 17 (FIG. 1). The armature of the coil is linked to the diaphragm of the vacuum regulator valve 17 so that an increase of force on the armature of the coil due to the increase of potential across the coil will cause an increase in pull on the diaphragm of the vacuum regulator 17, resulting in a corresponding increase in the regulated vacuum output which is supplied to the vacuum operator 22. The vacuum operator 22 translates the vacuum output of the vacuum regulator valve into linear motion. Although other vacuum operators could be employed, the device tested in this particular embodiment consists basically of a rubber bellows 81 held extended by means of a spring (not shown). When a vacuum is created in the bellows, the bellows contract in the known manner in proportion to the vacuum. Mounted on the bellows is a rod 80 that has a bead chain 82 connected thereto, which chain is connected to the throttle rod. Therefore, as the bellows contract with the increase in vacuum, the chain is moved to increase the throttle opening to increase the speed of the motor.

Should the speed of the car be greater than the speed which was set on the capacitor 37, the potential from the alternator 12, which is coupled to gate 75, will increase thereby reducing the conduction of field effect transistor 45 which in turn reduces the drive of transistor 47 of the amplifier, thereby reducing the output of the power output transistor 48. This reduces the current through the coil 65 and decreases the pull on the diaphragm of the vacuum regulator 17, resulting in a corresponding decrease in the regulator vacuum output which is supplied to the vacuum operator 22. With less vacuum in the vacuum operator, the pull on the throttle is decreased resulting in a decrease on the throttle setting. It can be seen that if the vehicle speed tends to drift above or below the selected speed, the system senses this much sooner than a human operator and causes suitable correction in the throttle position resulting in gasoline economy.

A teeter-totter switch 90 provides a method for varying the speed of the car after the activate button has been pushed but without using the accelerator. A resistor 92 couples battery potential to the switch 90. Should the operator of the car desire to go slower than the automatic speed control is set for, he pushes the retard side of the switch 90. This couples battery potential to the base of output transistor 48 to cause that transistor to be saturated thereby lowering the voltage of collector 57 below the drop-out voltage of relay 60 and causing contact 62 to open thereby removing potential from across the relay 65. With no vacuum from the vacuum regulator valve 17 the vacuum operator 22 will act to move the throttle to the idle position causing the car to slow down. Should the operator now desire to resume speed, he needs only to press the resume side of the teeter-totter switch 90. Pressing the resume side of the switch couples the battery potential across relay 60 to close the contact 62 thereby energizing vacuum regulator coil 65 which brings the car back to the desired speed. The diode 91 prevents transistor 48 from shunting relay 60. Because the activate button 10 did not have to be used, the charge on capacitor 37 remains the same which permits the speed control system to regulate the car back to the speed of the potential represented on capacitor 37.

Several interlocks have been included for safety of operation. Both electrical and electromechanical interlocks have been incorporated to disable the vacuum regulator valve if the brakes are applied. Stepping on the brakes closes brake switch 95 which lights brake light 97, and this potential is applied to the solenoid 98. Solenoid 98 is a component of vacuum relief valve 25 (FIG. 1). The vacuum relief valve 25 has two ports, one port which is always open to the atmosphere and the other port which is connected to the vacuum operator 22 through line 100 in FIG. 1. When the solenoid 98 is energized, a plunger is activated by the solenoid which unseals the line 100 leading to the vacuum operator 22 venting atmospheric pressure into the vacuum operator 22 and returning the diaphragm of the vacuum servo 22 to its normal position thereby moving the throttle to its idle position. In some installations it would be possible to eliminate the solenoid 98 and have the plunger coupled through a mechanical linkage to the brake pedal so that operation of the pedal would be translated through the linkage to operate the plunger to vent atmospheric pressure into the operator 22.

Closing the brake switch 95 also applies battery potential through resistor 94 to the base 55 of transistor 48. This drives the transistor 48 into saturation thereby reducing the voltage on collector 57 which permits the relay 60 to open contact 62 thereby removing the potential across the vacuum valve coil 65 which acts through the vacuum operator 22 to return the throttle to its idle position. As an alternative applying the brakes could open a brake switch represented at 93 which would also act to remove the potential from vacuum regulator coil 65.

A neutral interlock is provided in order to prevent the operator from accidentally locking the system in when starting the car in neutral or park. The diode 110 is connected to the neutral or park switch 112 of the automatic transmission or drive selector. One side of the switch is grounded either directly or through the starter relay. The other side of the neutral switch is connected to the start position of the ignition switch 21 (FIG. 1). The diode 110 is connected to the battery potential through the start position of the ignition switch. As the car is being cranked, the diode blocks spurious spikes which could trigger the power output stage transistor 48 of the amplifier. Once the start operation is completed, the diode 110 virtually grounds the base of transistor 48 and prevents the system from locking in at any speed.

Finally, should the power output transistor 48 become shorted, the voltage on the collector 57 will drop below the required voltage to hold in contacts 62, thereby causing the contacts to open to effectively remove the potential from across relay 65.

In the disclosed embodiment of the invention it has been found that components of the folowing types and values provide satisfactory results. These values, of course, are not intended to limit the application in any manner.

| Component | Value |
|---|---|
| Resistor 40 | 470K ohms. |
| Resistor 39 | 1 megohm. |
| Resistor 68 | 0–500 ohms. |
| Relay 32 | 200 ohms, 3000 turns No. 39 wire. |
| Resistor 70 | 70 ohms. |
| Resistor 41 | 1000 ohms. |
| Resistor 50 | 6800 ohms. |
| Transistor 47 | Type 48S-134832. |
| Field effect transistor 45 | Type MM2103. |
| Capacitor 37 | 1 microfarad. |
| Resistor and RC network 74 | 1 megohm. |
| Capacitor and RC network 74 | .25 microfarad. |
| Diode 72 | SR390. |
| Resistor 54 | 0–10,000 ohms. |
| Resistor 51 | 6800 ohms. |
| Transistor 48 | Type 2N3402. |
| Resistor 64 | 220 ohms variable. |
| Capacitor 74 | 8 microfarads. |
| Relay 60 | 3000 turns No. 39 wire—100 ohms. |
| Diode 36 | Type SR390. |
| Vacuum regulator relay 65 | 2700 turns No. 32 wire—70 ohms. |
| Diode 110 | SR–390. |
| Coil 98 | 30 ohms. |
| Resistor 92 | 470 ohms. |
| Diode 91 | Type SR390. |

What has been described is an improved speed control for a vehicle that provides constant speed operation to reduce driver fatigue and increase gasoline mileage and which has a memory capability to restore the vehicle to the desired constant speed should the system be temporarily disabled, which is simple, compact and relatively inexpensive to manufacture.

What is claimed as new is:

1. In equipment which includes a cyclically moving member and means producing a potential representing the repetition rate thereof, a system for controlling the repetition rate of the member including in combination, a field effect transistor having first and second control electrodes, memory means for establishing and maintaining a potential representing the desired repetition rate of the member, said memory means being coupled to said first control electrode, means coupling the potential representing the repetition rate of the member to said second control electrode, circuit means coupling said field effect transistor to said rate control means for the moving member with said field effect transistor being responsive to the potential coupled to said first control electrode from said memory means and said potential representing said repetition rate of said member coupled to said second control electrode to energize said rate control means thereby controlling the repetition rate of the cyclically moving member.

2. The system for controlling the repetition rate of the cyclically moving member of claim 1 further including contact means for energizing the system and wherein said memory means is a capacitor, said capacitor being responsive to the closing of said contact means to be charged to a predetermined potential and to the opening of said contact means to be discharged to a potential representing the desired repetition rate of the member, and said capacitor maintaining said potential representing the desired repetition rate of the moving member with said contact means being open.

3. The system for controlling the repetition rate of a cyclically moving member of claim 1 wherein said circuit means includes an amplifier having a driver stage and a power output stage, said driver stage being coupled to the output of said field effect transistor and said power output stage being coupled to said rate control means, with the potential from said memory means representing the desired repetition rate of the member being coupled to said first gate and the potential representing the repetition rate of the member being coupled to said second gate, said field effect transistor biasing said driver stage of said amplifier means to drive said power output stage thereof to energize said rate control means thereby controlling the repetition rate of the cyclically moving member.

4. A system for controlling the rate of travel of a motor vehicle under conditions specified including in combination, means for producing a potential representing the rate of travel of the vehicle, a field effect transistor having first and second control electrodes, memory means including a capacitor and means for establishing thereon a potential representing the desired rate of travel of the vehicle, said capacitor being coupled to said first control electrode, means coupling the potential representing the rate of travel of the vehicle to said second control electrode, amplifier means coupled to said field effect transistor, rate control means for the motor vehicle and relay means coupled to said amplifier means for connecting said rate control means thereto and for connecting said capacitor to said means for establishing a potential thereon, with said field effect transistor being responsive to the potential coupled to said first control electrode from said capacitor and said potential representing the rate of travel of said member coupled to said second control electrode to bias said amplifier means to actuate said relay means for connecting said rate control means thereto to thereby control the rate of travel of the vehicle and to disconnect said capacitor from said means so that the potential thereon is maintained.

5. A system for controlling the rate of travel of a vehicle of claim 4 further including switch means for retarding and resuming the rate of travel of the vehicle and having first and second operating positions, and the system wherein said amplifier means includes a driver stage and a power output stage, said switch means in said first operating position couples a potential to said power output stage of said amplifier means to disable said rate control means to retard the rate of travel of the vehicle, and said switch means in said second operating position energizes said rate control means to resume the desired rate of travel of the vehicle.

6. A system for controlling the rate of travel of a vehicle of claim 4 which vehicle has braking means and further includes electrical interlock means, said electrical interlock means being responsive to the application of the vehicle braking means to disable said rate control means.

7. The system for controlling the rate of travel of the vehicle of claim 4 wherein said rate control means comprises a vacuum regulator valve including a solenoid, said solenoid being connected to said amplifier means, a vacuum operator coupled to the vacuum regulator valve and a throttle coupled between said vacuum operator and the motor, so that coupling said potential representing the desired rate of travel of the vehicle to said first control electrode and with the rate of travel of the vehicle below the desired rate of travel the potential representing the rate of travel coupled to said second control electrode is decreased causing said field effect transistor to bias said amplifier means to increase the current through said solenoid to control said vacuum regulator valve to vary said vacuum operator thereby advancing said throttle to increase the rate of travel of the vehicle, and with the rate of travel of the vehicle above the desired rate of travel the potential representing the rate of travel is increased causing the field effect transistor to bias said amplifier means to decrease the current through said solenoid to control said vacuum regulator valve to vary said vacuum operator thereby retarding said throttle to decrease the rate of travel.

8. The system for controlling the rate of travel of a vehicle of claim 7 which vehicle has braking means and further includes a vacuum relief valve coupled to said vacuum operator, said vacuum relief valve being responsive to the application of the vehicle braking means to vent atmospheric air to said vacuum operator to disconnect said vacuum operator from said throttle.

9. The system for controlling the rate of travel of a vehicle of claim 4 wherein said amplifier means includes a driver stage and a power output stage, said driver stage being coupled to the output of said field effect transistor and said power output stage being coupled to said rate control means for the vehicle, and the system further comprises activating means including contacts for energizing the system to control the rate of travel of the vehicle, wherein operation of the activating means closes said contacts to charge said capacitor to a predetermined potential and release of said activating means opens said contacts to discharge said capacitor to a potential representing the desired rate of travel of the vehicle, said capacitor maintaining said potential representing the desired rate of travel of the vehicle with said contact means being open.

10. A system for controlling the rate of travel of a vehicle of claim 9 further including electrical interlock means, said electrical interlock means being responsive to the shorting of said power output stage of said amplifier means to disable said rate control means.

11. A system for controlling the rate of travel of a vehicle of claim 9 which vehicle has a drive selector including neutral and park positions and further includes neutral interlock means coupled to said power output stage of said amplifier means, said neutral interlock means coupling a potential to said power output stage in response to operating the vehicle motor with the drive selector in a neutral or park position thereby disabling said rate control means.

References Cited

UNITED STATES PATENTS

| | | | |
|---|---|---|---|
| 3,153,746 | 10/1964 | Atkinson | 317—5 |
| 3,195,672 | 7/1965 | Brennan | 180—105 |
| 3,198,985 | 8/1965 | Haskell | 317—5 |
| 3,297,104 | 1/1967 | Fox | 180—109 |
| 3,340,950 | 9/1967 | Hopengarten | 180—105 |

A. HARRY LEVY, *Primary Examiner.*